United States Patent
Engstrom et al.

(10) Patent No.: US 7,099,921 B1
(45) Date of Patent: Aug. 29, 2006

(54) METHOD AND APPARATUS FOR PEOPLE TO SIMPLY COMMUNICATE THEIR LOCATION AND ACTIVITY INFORMATION

(75) Inventors: Eric Engstrom, Kirkland, WA (US); Christopher Phillips, Woodinville, WA (US)

(73) Assignee: Hall Aluminum LLC, Los Altos, CA (US)

( * ) Notice: Subject to any disclaimer, the term of this patent is extended or adjusted under 35 U.S.C. 154(b) by 659 days.

(21) Appl. No.: 09/690,692

(22) Filed: Oct. 16, 2000

(51) Int. Cl.
*G06F 15/16* (2006.01)
*G06F 15/173* (2006.01)

(52) U.S. Cl. .................. 709/206; 709/207; 709/223; 709/245

(58) Field of Classification Search ............... 709/203, 709/206–207, 217–219, 223–225, 227, 245
See application file for complete search history.

(56) References Cited

U.S. PATENT DOCUMENTS

| | | | | |
|---|---|---|---|---|
| 6,243,039 B1* | 6/2001 | Elliot | .................. | 342/457 |
| 6,278,370 B1* | 8/2001 | Underwood | ............. | 340/573.1 |
| 6,300,875 B1* | 10/2001 | Schafer | .................. | 340/573.1 |
| 6,327,533 B1* | 12/2001 | Chou | .................. | 701/207 |
| 6,327,570 B1* | 12/2001 | Stevens | .................. | 705/7 |
| 6,343,317 B1* | 1/2002 | Glorikian | .................. | 709/218 |
| 6,442,263 B1* | 8/2002 | Beaton et al. | ......... | 379/142.04 |
| 6,456,854 B1* | 9/2002 | Chern et al. | ............... | 455/457 |
| 6,542,075 B1* | 4/2003 | Barker et al. | ............... | 340/506 |
| 6,546,336 B1* | 4/2003 | Matsuoka et al. | .......... | 701/213 |
| 6,618,593 B1* | 9/2003 | Drutman et al. | .......... | 455/456.3 |
| 6,647,267 B1* | 11/2003 | Britt et al. | ............... | 455/404.2 |
| 6,716,101 B1* | 4/2004 | Meadows et al. | ......... | 455/456.1 |
| 6,853,916 B1* | 2/2005 | Fuchs et al. | ................ | 701/213 |

* cited by examiner

*Primary Examiner*—Ario Etienne
*Assistant Examiner*—Hussein Elchanti
(74) *Attorney, Agent, or Firm*—Schwabe, Williamson & Wyatt, P.C.

(57) ABSTRACT

A mobile client device, on behalf of a user, is equipped to submit an identity of the user to a messaging service, including the user's current location. Once the messaging service receives the identity of the user, and the user's current location, the messaging service, in response, selects one or more recipients remotely disposed by the mobile client device and the messaging service to receive the user's current location, based at least in part on the identity of the user. The recipient receives the the user's current location for information purposes. In one embodiment, the identity of the user, in addition the user's current location, is also transmitted to the selected one or more recipients. As a result, users, in particular, youths, are able to notify to recipients, such as their parents/guardians, and each other of their whereabouts simply, efficiently and effectively. In other embodiments, the submission is triggered based on biometric data of the user, and includes the triggering biometric data. These embodiments have special applications for older users. Additionally, some recipients, such as parents/guardians, are empowered to initiate receipt of the user's current location, thereby providing a non-intrusive way of keeping track of the locations of the youths for their peace of mind. In various embodiments, the client device may be a wireless telephone or a palm sized computing device.

27 Claims, 7 Drawing Sheets

1000

| User ID 1002 | User Name and Password 1004. | Recipients (Family) 1006 | Recipients (Friends) 1008 | Recipients (Other) 1010 |
|---|---|---|---|---|
| | | | | |
| | | | | |
| | | | | |
| | | | | |

METHOD AND APPARATUS FOR PEOPLE TO SIMPLY COMMUNICATE THEIR LOCATION AND ACTIVITY INFORMATION

FIELD OF THE INVENTION

The present invention relates to the fields of wireless communication devices and related devices. More specifically, the present invention relates to people (especially younger people) communicating their location and activity information via wireless communication.

BACKGROUND OF THE INVENTION

Advances in computer and telecommunication technology have led to wide spread adoption of mobile client devices, from the basic wireless telephones to function rich notebook sized computers that pack the power of a desktop computer. In between are web enabled wireless telephones, palmed sized personal digital assistants and so forth. As a result of the relatively low cost, today even youths, i.e., people who are not emancipated, are in possession of these devices.

Often times, these youths would find themselves in need of certain services such as the basic need of calling their parents/guardians and letting them know where they are or letting their friends know where they are in malls or around town. Under the prior art, i.e., the web enabled wireless telephones, palmed sized personal digital assistants and so forth, even though it may be a few key strokes to make the phone call, youths often find is too cumbersome to make the call. Moreover, because of the number of keystrokes, the call cannot be placed discretely without being noticed by their peers, who often deems having to call and inform one's parents of one's whereabouts is especially "uncool".

Furthermore, under the prior art, even if youths are willing to make the call, youths would have to determine their current address/location. The added layer of difficulty just gives youths another excuse not to call.

In the mean time, in order to learn the current address/location of the youths, parents/guardians most likely have to call them or their friends, and this may cause the youths to be embarrassed and/or defensive due to their disposition against being constantly checked up on.

As a result, despite the advances in technology today, this prior art process is not youth friendly and may cause tension between youths and parents/guardians. Thus, a need exist for a more simple and efficient/effective approach for youths to notify their parents/guardians and each other of their whereabouts, and a non-intrusive approach for knowing the activities of the youths by the parents/guardians for their piece of mind.

SUMMARY OF THE INVENTION

A mobile client device, on behalf of a user, is equipped to submit an identity of the user to a messaging service, including the user's current location, with reduced number of keystrokes; in one embodiment, using a single function button. Once the messaging service receives the identity of the user, and the user's current location, the messaging service, in response, selects one or more eligible recipients from a list of candidate recipients to receive the user's current location, based at least in part on the identity of the user. The selected recipients, remotely disposed from the messaging service, receive the identity of the user and the user's current location for information purposes. The identity of the user and the user's current location may be transmitted to the selected remote recipients in any one of a number of message formats, using any one of a number of communication protocols. As a result, users, in particular, youths, are able to notify to recipients of interest to the users, such as their parents/guardians, of their whereabouts simply, efficiently and effectively.

Additionally, in some embodiments, the user's current location is provided with previously visited locations, together forming an activity log of the user.

Further, in some embodiments, certain eligible recipients, such as parents/guardians, are enabled to initiate receipt of a user's current location, or the user's activity log. As a result, parents/guardians are provided a non-intrusive way of keeping track of the locations and the activities of the youths for their peace of mind.

In yet other embodiments, the submission of the user's current location is triggered based at least in part on bio-metric data, such as the user's heart rate. In preferred ones of these embodiments, the submission includes selected ones of the bio-metric data.

In various embodiments, the user's client device may be a wireless telephone or a palm sized computing device.

BRIEF DESCRIPTION OF DRAWINGS

The present invention is illustrated by way of example and not by way of limitation in the figures of the accompanying drawings, in which the like references indicate similar elements and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as end-user interfaces, buttons, and so forth, commonly employed by those skilled in the art to convey the substance of their work to others skilled in the art. Parts of the description will be presented in terms of operations performed by a computing device, using terms such as submitting, requesting, selecting, confirming and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalone, adjunct or embedded.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may.

Figure 1:
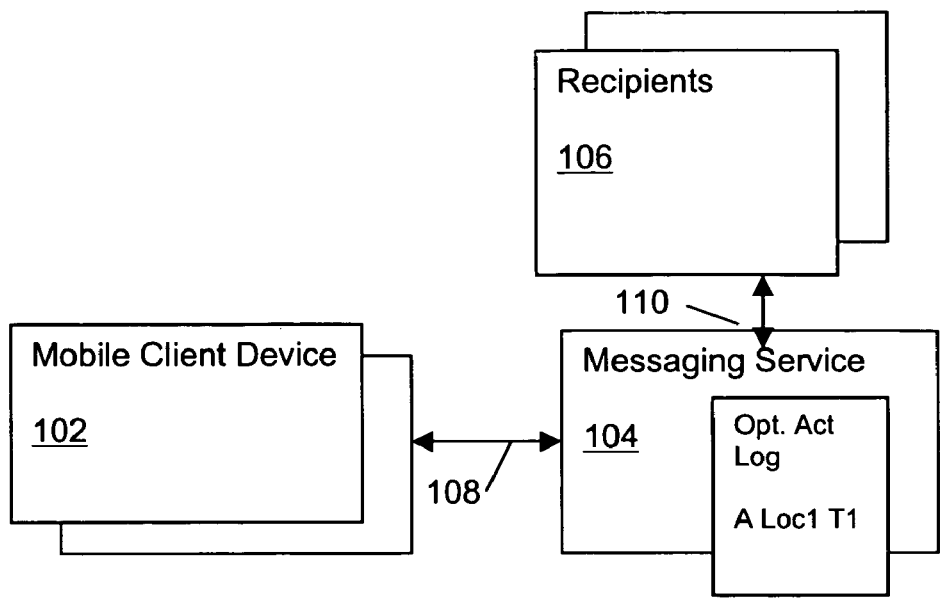
FIG. 1 illustrates an overview of the present invention, in accordance with one embodiment.
Figure 2:
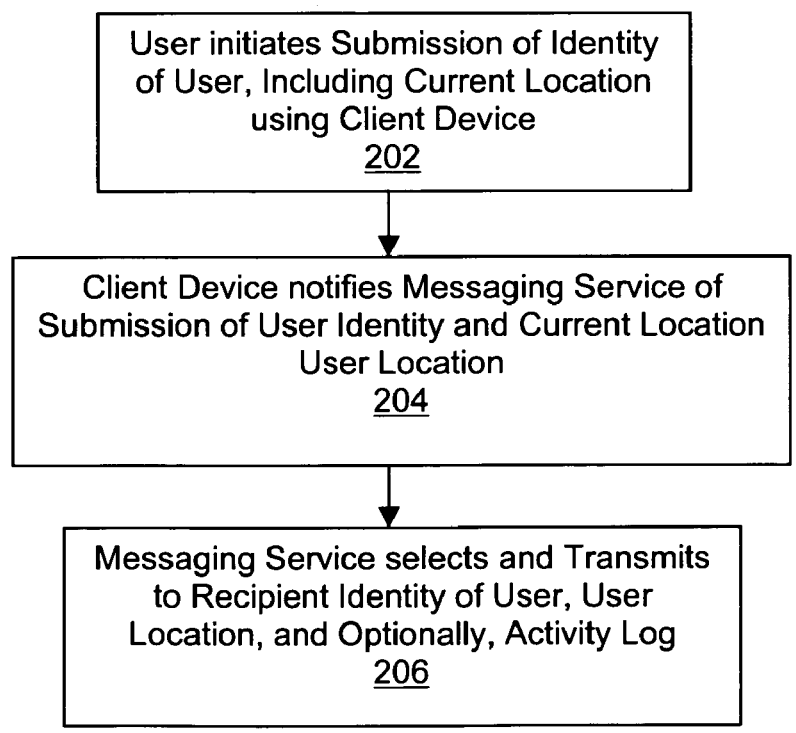
FIG. 2 illustrates a method view of the present invention in accordance with one embodiment.

Referring now to FIGS. 1 and 2, wherein a block diagram illustrating an overview and a method view of the present invention in accordance with one embodiment are shown. As illustrated, a user, using a mobile client device 102, initiates submission of an identity of the user, block 202. In response, client device 102 notifies messaging service 104 of the submission of identity of the user, including in particular, the user's current location, block 204. The submission of the identity of the user, including the user's current location, may be communicated to the messaging service 104, via a wireless or wire line based communication link 108, using any one of a number of communication protocols (such as TCP/IP) known in the art.

In one embodiment, the messaging service 104 accumulates the successively provided current locations, thereby forming an activity log of the user. As will be described later, the activity log may also include duration of time spent at the visited locations. In one embodiment, the activity log is updated each time the messaging service 104 is contacted with the user's current location. Alternatively, in one embodiment, the activity log may first be accumulated at the mobile client device 102 with the accumulated log being downloaded to the messaging service during one of the submissions of the user's current location. The accumulated activity log may then be subsequently transmitted to a recipient requiring such information, such as a parent/guardian of the user.

In one embodiment, the identity of the user may be signed, to facilitate authentication of the identity as the intended user of the mobile client device.

Messaging service 104 enhanced with the teachings of the present invention, in turn, selects one or more recipients 106, based at least on the identity of the user (after authentication, if the identity is signed), block 206. As will be described in detail later, the selection may be made from a predetermined table of identities of users having corresponding eligible recipients. Eligible recipients of a user are pre-established with messaging service 104. Recipients' eligibility may vary, some permanently, some for a finite duration. In addition to the basic delivery information, such as the preferred delivery format, i.e. email, fax and so forth, and the duration of the recipients' eligibility, recipients may also be associated with various selection attributes. Establishments of these recipient "properties" may be performed by the user while registering with messaging service 104, or updated periodically thereafter. Registration and the subsequent updates may be facilitated using any one of a number of user interaction techniques known in the art.

In other embodiments, the selection may also be based on other criteria, such as intended recipients manually inputted by the user in the mobile client device to direct the messaging service to select those manually inputted recipients. Additionally, the manually inputted recipients may be recipients in addition to the recipients selected by the messaging service. In this manner, recipients of the identity of the user and the user's current location are controlled without allowing wide dissemination of such information. For example, the manually inputted recipient may be a temporal companion of the user, where the user is trying to indicate to the temporal companion his/her location in a shopping mall, i.e., the two were to meet some place in the shopping mall, and they would like to know the current location of the each other.

In one embodiment, certain eligible recipients may be enabled to initiate submission of the identity of the user instead of the user initiating the submission. Again, such ability may be defined as a "property" of the eligible recipients. For example, a parent/guardian may want to know the locations and activities of their children without having to contact them. Accordingly, a user may pre-enable his/her parent/guardian to be able to initiate receipt of the user's current location or activity log.

Upon "selection" (i.e. either by the user or messaging service, as a result of the user or the recipient's initiation), messaging service 104 transmits the identity of the user, including last known location, and optionally, the previously visited locations, i.e. the activity log, to the selected recipient 106, block 206. The transmission may be made in the form of an email, a pager message, a facsimile transmission, and other electronic messages through communication link 110, which may be a wireless or wire line based communication link, using any one of a number of communication protocols known in the art.

In one embodiment, the user may manually restrict dissemination of the activity log. For example, a user would not desire to have a companion, such as a friend, acquire such information regarding their activities.

Alternatively, in one embodiment, the user may not manually restrict the dissemination of the activity log. For example, a selected recipient, such as a parent/guardian, may require such information at all times.

As a result, youths are able to notify to their parents/guardians and each other of their whereabouts simply and efficiently/effectively. Additionally, parents/guardians are provided a non-intrusive way of keeping track of the locations of the activities of the youths for their peace of mind.

Figure 3:
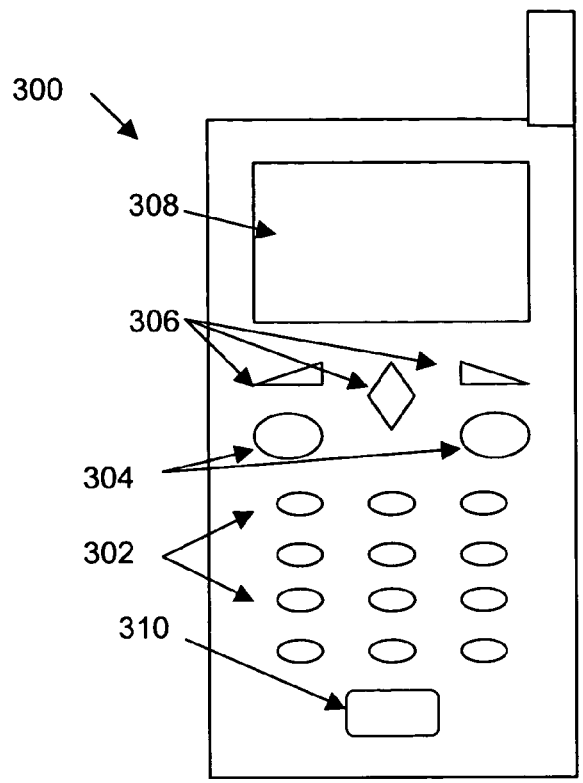
FIGS. 3 and 4 illustrate a perspective and architectural view of an enhanced wireless telephone incorporated with the teachings of the present invention, in accordance with one embodiment.
Figure 4:
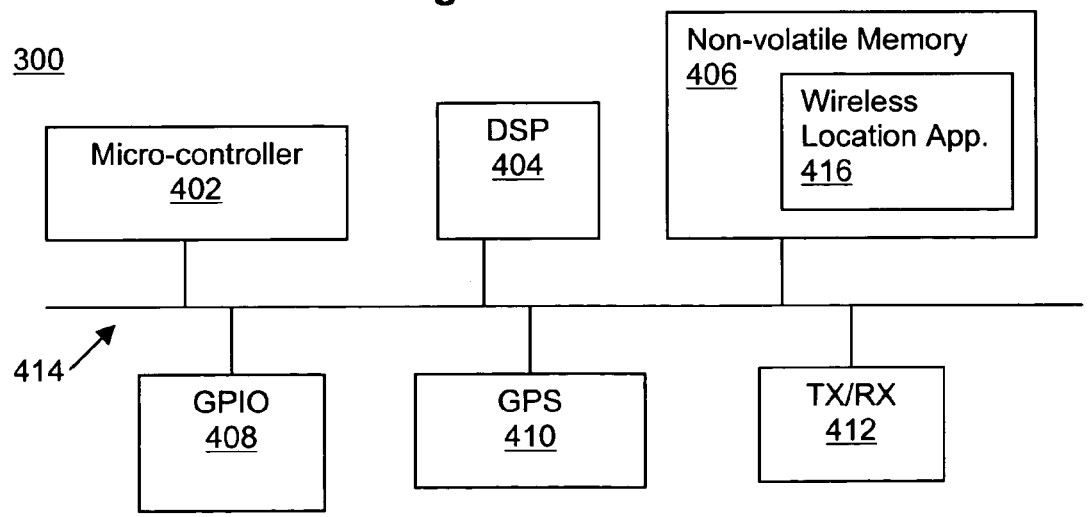

FIGS. 3 and 4 illustrate a perspective and an architectural view of an enhanced wireless telephone as a client device for practicing the present invention, in accordance with one embodiment. As illustrated, similar to a conventional wireless telephone, wireless telephone 300 includes key-pad 302, "talk" and "end talk" buttons 304, cursor control buttons 306, and display screen 308. However, unlike prior art wireless telephones, wireless telephone 300 is equipped with a dedicated "Here I Am" function button 310 (hereinafter, simply "Here I Am" button. In alternate embodiments, buttons to manually input recipients and to restrict the activity log may be provided allowing for customization of the "Here I Am" button by the wireless telephone owner. Such customization may be facilitated via conventional support for setting the operating parameters of wireless telephone 300, which is known in the art, accordingly will not be further described.

In one embodiment, the "Here I Am" button may not be a button at all, but a voice activated function. The user of the wireless telephone only needs to initialize the wireless telephone to recognize the user's voice and speech patterns. Once initialized, the user only needs to speak into the wireless telephone "here I am", and the wireless phone will initiate the submission of the identity of the user, including the user's current location. Voice recognition initialization of electronic devices is know in the art, accordingly, will not be discussed in further detail.

Similarly, from an architectural perspective, wireless telephone 300 includes elements found in conventional wireless telephones, such as micro-controller 402, digital signal processor (DSP) 404, non-volatile memory 406, general purpose input/output (GPIO) interface 408, and transmit/receive (TX/RX) 412. However, wireless telephone 300 advantageously includes global positioning system (GPS) 410, which is equipped to provide a user of wireless telephone 300 his/her current location. Further, wireless telephone 300 is provided with enhanced wireless location application 416 incorporated with the teachings of the present invention. In alternate embodiments, the present invention may be practiced with wireless telephone 300 merely having access to an external GPS unit instead (as opposed to an integrated GPS unit as illustrated).

Except for the teachings of the present invention incorporated with wireless location application 416, the functions and constitutions of the various enumerated elements are known in the art, accordingly will not be further described.

Figure 5:
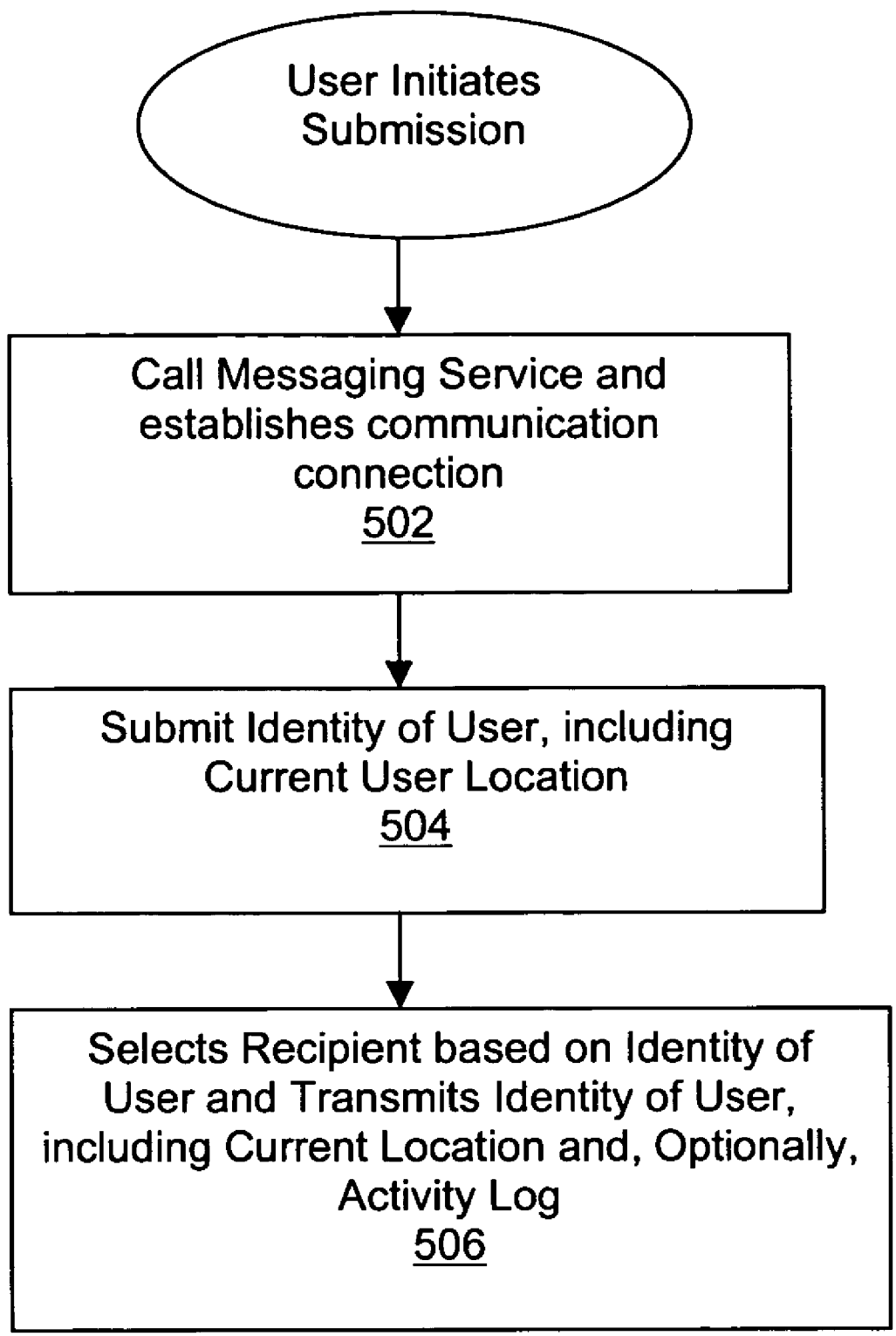
FIG. 5 illustrates the operational flow of the relevant aspects of enhanced wireless location application 416, in accordance with one embodiment.

FIG. 5 illustrates the operational flow of the relevant aspects of enhanced wireless location application 416, in accordance with one embodiment. As illustrated, in response to a user initiating submission of an identity of a user, including the user's current location by pressing the dedicated "Here I Am" function key 310, wireless location application 416 calls messaging service 104 and establishes a communication connection, block 502. Next, for the illustrated embodiment, wireless location application 416 submits a pre-established identity of the user and the mobile client, including the user's current location (provided by GPS unit 410), block 504.

The pre-established identification of the user and the device will be utilized to select the appropriate recipient/recipients, e.g. the pre-established identification of Justin is utilized to select Justin's parents and/or Justin's friends. As described earlier, upon receipt of the identity of the user and the user's current location, messaging service 104 selects a recipient 106 based at least in part on the identity of the user, and transmits the identity of the user, along with the user's current location, and optionally, the accumulated activity log to the selected recipient 106 to provide information as to their whereabouts, block 506.

In one embodiment, the messaging service 104 may access a navigation web site, for example, MapQuest™.com, Inc. of New York, N.Y., and retrieve location details such as, but not limited to, names of individual locations, e.g., the user's current location is Johnny's Cafe at 1234 $5^{th}$ Avenue; previous location was Justin's department store at 5678 $12^{th}$ Avenue, and so forth.

Thus, it can be seen from the above description, a youth using a wireless telephone 300 incorporated with the present invention may notify their parents/guardians or friends of their whereabouts with a simple operation. In other words, the present invention may be practiced to offer a "one click" "here I am" function, from a mobile client device, such as a wireless mobile telephone.

Alternatively, in one embodiment, the recipient may initiate the submission of the identity of the user, including the user's current location by requesting the submission from a remote device such as, for example, a conventional telephone of the parent/guardian. The request may be achieved by an empowered recipient who is among the eligible recipients that may be selected and not by people not associated with the user of the mobile client device. Additionally, the recipient who desires to initiate the submission may be required to have knowledge of the identity of the user, including a password associated with the intended user, in order for the requested information to be provided. Thus, a parent/guardian may learn of the activities and location of their youth without being intrusive and calling the youth to ask question about their activities.

As a result, youths are able to notify to their parents/guardians and each other of their whereabouts and activities simply and efficiently/effectively. Additionally, parents/guardians are provided a non-intrusive way of keeping track of the activities of the youths for their piece of mind.

Figure 6:
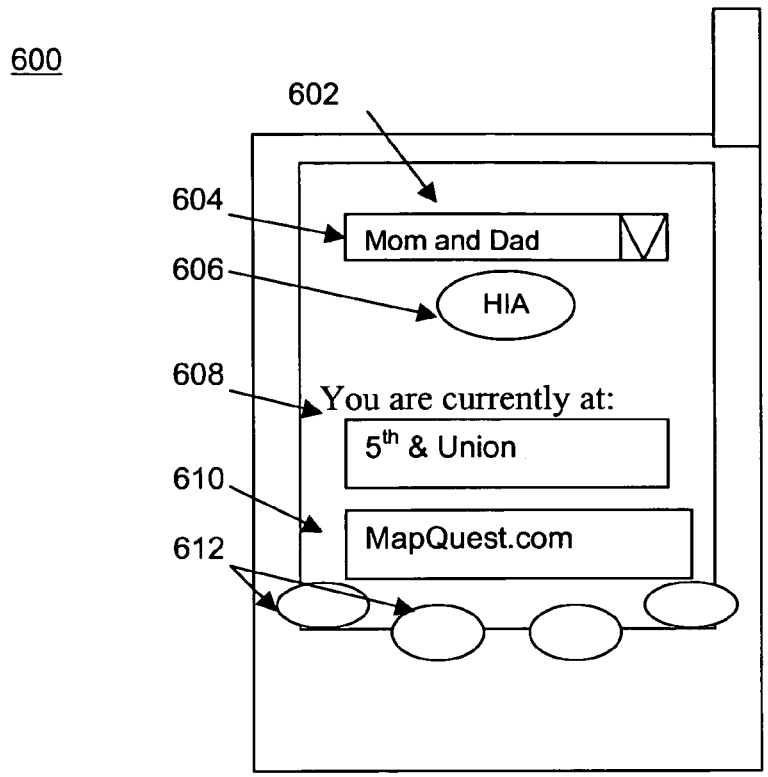
FIGS. 6 and 7 illustrate a perspective and architectural view of an enhanced palm sized computing device incorporated with the teachings of the present invention, in accordance with one embodiment.
Figure 7:
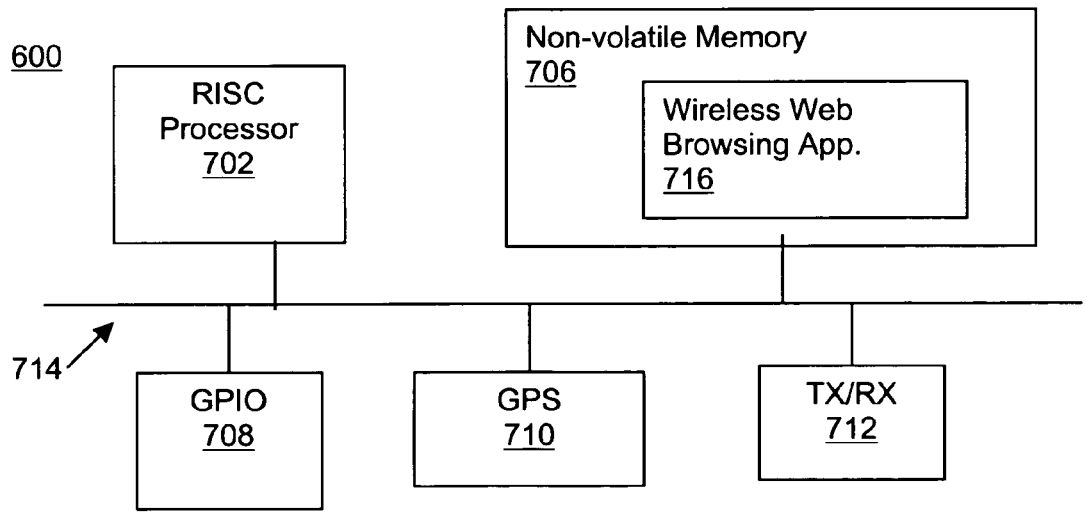

FIGS. 6 and 7 illustrate a perspective and an architectural view of an enhanced palm sized digital personal assistant (PDA) as a client device for practicing the present invention, in accordance with one embodiment. As illustrated, similar to a conventional palm sized PDA, PDA 600 includes control buttons 612 and display screen 602. Architecturally, PDA 600 includes elements found in conventional PDA devices, such as RISC processor 702, non-volatile memory 706, general purpose input/output (GPIO) interface 708, and transmit/receive (TX/RX) 712. However, similar to the earlier described wireless telephone embodiment, PDA 600 includes global positioning system 710, which is equipped to provide a user of PDA 600 his/her current location. Further, PDA 600 is provided with wireless web browsing application 716 designed for a wireless PDA device with limited computing power, communication bandwidth and display capability. As in the earlier described wireless telephone embodiment, in alternate implementations, PDA 600 may be merely provided with access to an external GPS unit instead (as opposed to an integrated GPS unit as illustrated).

Alternatively, because of the increased memory capabilities of the PDA 600 over the wireless mobile telephone 300, in one embodiment the GPS 410 may be equipped to track previous locations as well as current location, including a duration of time spent at the locations. In this embodiment, the PDA 600 accumulates an activity log and stores the accumulated activity log in memory 706. The user may download the accumulated activity log to the messaging service 104 along with the identity and the user's current location. Alternatively, the PDA 600 may inform the user that a download from the PDA 600, may be required due to space availability in memory 706. Tracking locations and durations of time spent at the tracked locations are well known and commonly associated with GPS devices, accordingly, will not be discussed in further detail.

Rendered on display screen 602 is a service request "Here I Am" "home" page. For the illustrated embodiment, the "Here I Am" "home" page includes a "drop down" menu of recipients 604, "Here I Am" button 606, and current location display 608. Thus, under this embodiment, a user of PDA 600 may manually select one or more recipients of the identity of the user and the user's current location, and optionally, an accumulated activity log of the user, from the "drop down" menu 604. The recipients may include such recipients as parents/guardians and friends of the user.

The recipients included in "drop down" menu 604 for selection may be predetermined and set up by the user. Except for submitting and transmitting the identity of the user, including the current the user's current location, and optionally, the accumulated activity log, the functions and constitutions of the illustrated elements are known in the art, accordingly will not be further described.

Figure 8:
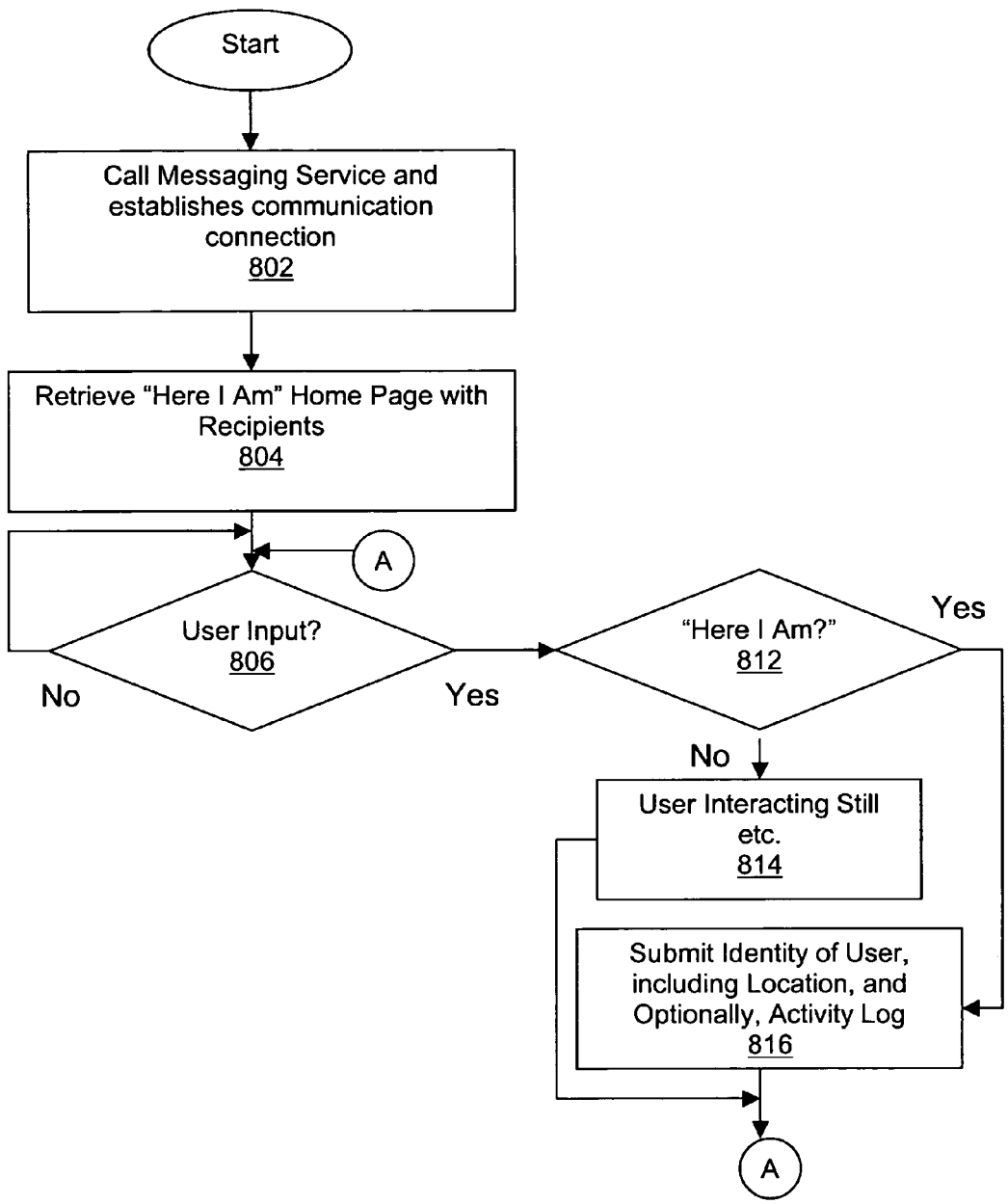
FIG. 8 illustrates the operational flow of the relevant aspects of the wireless web application of FIG. 7, in accordance with one embodiment.

FIG. 8 illustrates the operational flow of the relevant aspects of wireless web browsing application 716 executing the "Here I Am" "home" page, in accordance with one embodiment. As illustrated, in response to a user initiating a "Here I Am" "home" page (e.g. by selecting a "Here I Am" icon (not illustrated)), application 716 causes a call to be placed to messaging service 104 (e.g. by an underlying communication service), and a communication connection (such as a HTTP connection using TCP/IP) be established, block 802. Next, application 716 retrieves the "Here I Am" "home" page from messaging service 104, block 804. Thereafter, the code associated with the retrieved "Here I Am" "home" page (e.g. an applet downloaded with the "home" page) monitors for user inputs or interactions with the "Here I Am" "home" page, block 806.

Upon detection of an user input, the associated code further determines if the user has selected the "Here I Am" button 606, block 812. If not, it is assumed that the user is interacting with "drop down" recipient menu 604, block 814. The selected recipient field 604 is updated accordingly, depending on the user's inputs. On the other hand, if the user has selected the "Here I Am" button 606, the associated code submits an identity of the user, including the user's current location, and optionally, the accumulated activity log (using the established communication connection), block 816.

For the illustrated embodiment, it is further contemplated that messaging service 104 may resolve the geographical information received from PDA 600 to a qualitative description of the current location, e.g. "5$^{th}$ & Union", 608. Messaging service 104 may do so by accessing a geographic information file (GIF) (not shown), using the coordinates of the current location. GIF is known in the art. This further assists the recipient in confirming the location of the user.

In one embodiment, as discussed above with respect to the wireless telephone 300, messaging service 104 may resolve the geographical information received from PDA 800 by accessing a navigation web site, 610.

As a result, youths are able to notify to their parents/guardians and each other of their whereabouts and activities simply and efficiently/effectively using PDAs, as well. Additionally, parents/guardians are provided a non-intrusive way of keeping track of the activities of the youths for their peace of mind.

Figures 9, 10:
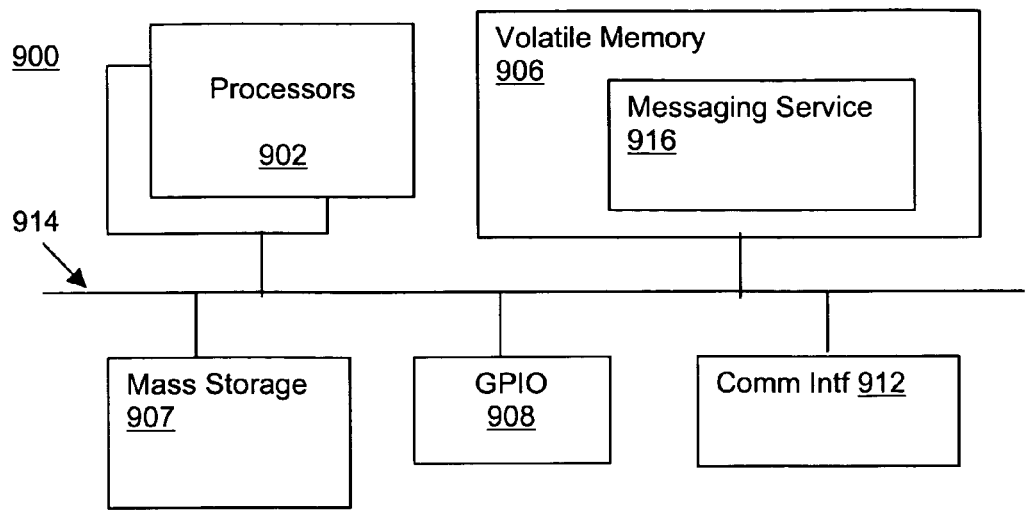
FIG. 9 illustrates an example server suitable for use to host messaging service 104 of FIG. 1, in accordance with one embodiment.
FIG. 10 illustrates a data structure suitable for use to store data associated with identity of users and mobile client devices and recipients to facilitate practice of the present invention.

FIG. 9 illustrates an example server suitable for use to host messaging service 104 of FIG. 1, in accordance with one embodiment. As shown, server 900 includes one or more processors 902 and system memory 906. Additionally, computer system 900 includes mass storage devices 907 (such as diskette, hard drive, CDROM and so forth), GPIO 908 (for interfacing with I/O devices such as keyboard, cursor control and so forth) and communication interfaces 912 (such as network interface cards, modems and so forth). The elements are coupled to each other via system bus 914, which represents one or more buses. In the case of multiple buses, they are bridged by one or more bus bridges (not shown). Each of these elements perform its conventional functions known in the art. In particular, system memory 904 and mass storage 906 are employed to store a working copy and a permanent copy of the programming instructions implementing messaging service 104. Except for its use to host the novel messaging service of the present invention, the constitution of these elements 902–914 are known, and accordingly will not be further described.

FIG. 10 illustrates a data structure suitable for use to store data associated with identity of users, last submitted locations of users, and recipients to facilitate practice of the present invention. As illustrated, table 1000 includes a column 1002 for storing an identifier for each "enrolled" user. In addition, table 1000 further includes a number of columns 1004 for storing the various basic information associated with an "enrolled" user, such as the user's name, user's "signature", and password associated with the user, e.g., user name: Justin; Justin's password: DaDa, and so forth. In particular, preferably a column is provided to store one or more indicators for the preferred mode of communication.

Table 1000 also includes a number of columns 1006–1010 for storing the eligible recipients provided by the user, and their "properties". The recipient may be placed in columns for family 1006, such as parents/guardians, friends 1008, and other people 1010 that the user may want to add to provide "Here I Am" information. Additionally, table 1000 includes other columns for storing the various early discussed properties, such as the duration a recipient is eligible to receive the location information, whether the recipient is eligible to contact messaging service 104 to receive the location information.

Table 1000 is illustrated as a single table for ease of understanding. As those skilled in the art will appreciate, a data structure involving multiple tables may be employed for storing the various data. In certain columns, such as recipients, pointers to the actual data, for example, to actual data such as the recipient's email address or their wireless telephone numbers, may be preprogrammed.

Figure 11:
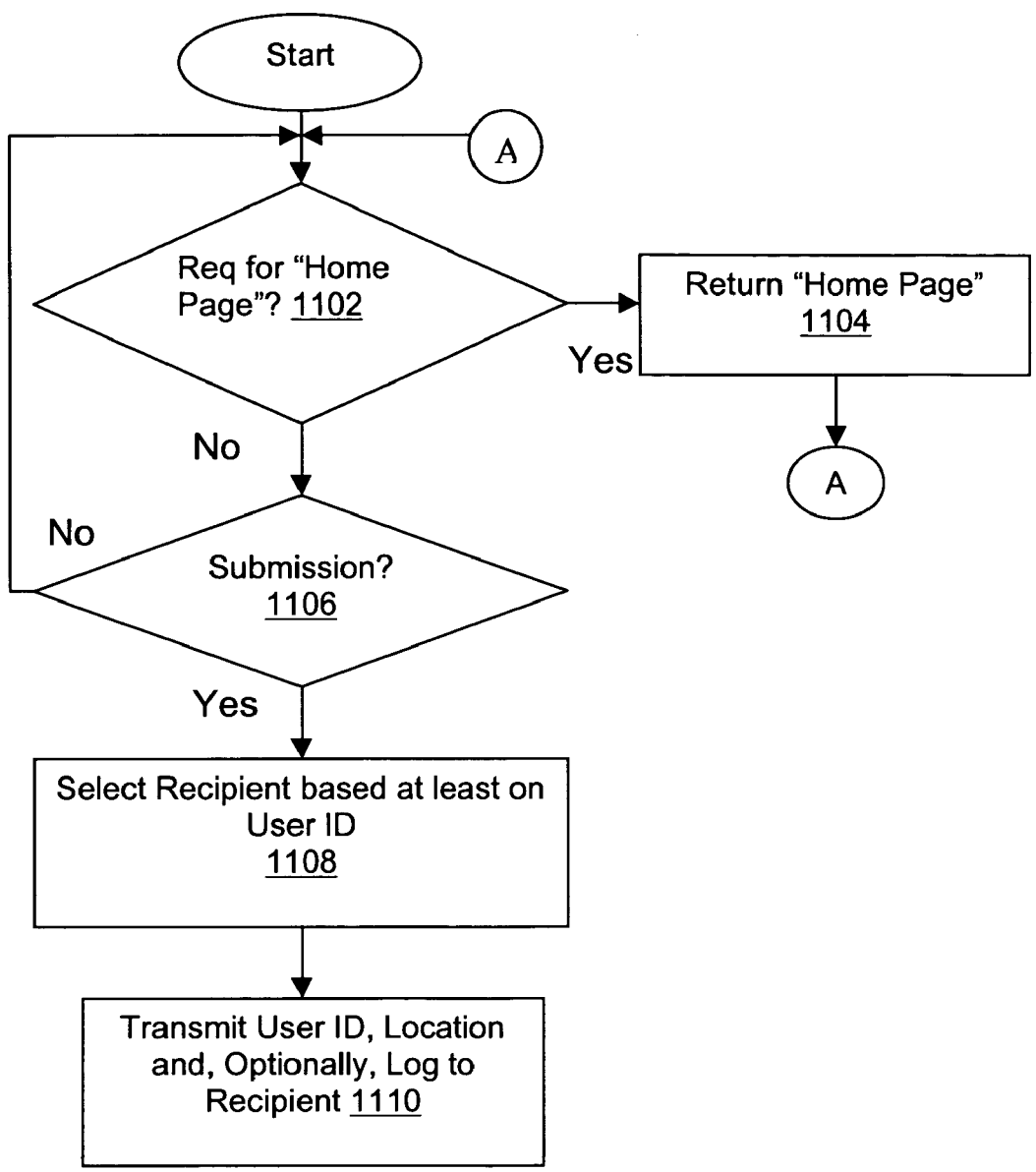
FIG. 11 illustrates the operational flow of the relevant aspect of messaging service 104, in accordance with one embodiment.

FIG. 11 illustrates the operational flow of the relevant aspect of messaging service 104, in accordance with one embodiment. As illustrated, upon invocation, messaging service 104 awaits for a submission of an identity of a user, including the user's current location, and optionally, an accumulated activity log of the user, or a request for its "Here I Am" "home" page, 1106 and 1102. In response to a request for the "Here I Am" "home" page 1104, messaging service 104 returns the "Here I Am" "home" page as requested, 1104. Thereafter, the process continues at 1102 again.

However, if a submission of an identity of a user, including the user's current location, and optionally, the accumulated activity log of the user, is received instead, as described earlier, messaging service 104 selects one or more recipient based at least on the received identity of the user, 1108. Furthermore, the current location of the user may be added to previously received and stored last locations of the user by the messaging service 104, including any accumulated activity logs that are also received. Then, the messaging service 104 transmits the identity of the user together with the user's current location, and optionally, accumulated activity log of the user, to the selected recipients 1110.

In one embodiment, in order to transmit parts or all of the information, including the optional activity log of the user, the messaging service 104 may require a password from the selected recipient. Alternatively, in another embodiment, the messaging service 104 may transmit all of the information, including the optionally accumulated activity log of the user if the selected recipient is a parent/guardian corresponding to the identity of the user.

Additionally, if a transitory recipient is manually inputted, the identity of the user, along with the user's current location, and optional activity log, is transmitted to the manually inputted transient recipient.

As previously discussed, youths are able to notify to their parents/guardians and each other of their whereabouts and activities simply and efficiently/effectively. Additionally, parents/guardians are provided a non-intrusive way of keeping track of the activities of the youths for their piece of mind.

Referring now back to FIGS. 3–5, in some embodiments, wireless mobile phone 300 include various sensors (not shown) for sensing and collecting bio-metric data of the user holding wireless mobile phone 300 for various bio-metrics. Examples of these bio-metric data include heart rate data of the user. Wireless mobile phone having integrated bio-metric sensors, such as heart rate sensors, is the subject of U.S. application Ser. No. 09/690,679, entitled "A Wireless Mobile Phone Having An Integrated Heart Rate Monitor", filed contemporaneously with the present invention, now U.S. Pat. No. 6,549,756. The co-pending application is hereby fully incorporated by reference.

For some of these embodiments, the earlier described submission of the user's current location is triggered (blocks 502–504 of FIG. 5) is further based on the bio-metric data collected by wireless mobile phone 300, e.g. when the heart rate of the user holding phone 300 exceeds certain pre-determined threshold, or for other bio-metrics falling below a predetermined threshold. The predetermined not-to-exceed/not-to-fall-below threshold preferably is programmable by the user, using any one of a number of configuration techniques known in the art. For presently preferred ones of these embodiments, the submission (block 504) also includes the bio-metric data.

Thus, it can be seen the present invention for facilitating a user in communicating his/her current location in a simple, efficient and effective way may also be beneficial to e.g. older citizens, who might want their current locations, including their bio-metric data, be easily communicated to a number of desired recipients, such as the users' doctors, nurses, spouses, children, co-workers and so forth. These recipients may be specified to messaging service 104 as earlier described.

Accordingly, methods and apparatuses for people to simply communicate their location and activity information has been described. While the present invention has been described in terms of the above illustrated embodiments, in particular, being especially useful to youths, those skilled in the art will recognize that the invention is not limited to the embodiments described. The present invention can be practiced with modification and alteration within the spirit and scope of the appended claims such as, practiced by adults. Thus, the description is to be regarded as illustrative instead of restrictive on the present invention.

What is claimed is:

1. A messaging service method comprising:
   receiving from a mobile client device, selection of a first recipient authorized to receive location information of a user of the mobile client device;
   receiving from the mobile client device, a current location of the user;
   selecting the first recipient to receive the user's current location, based at least in part on an identity of the user and the selection of the first recipient provided by the mobile client device, and independent of a current communication relationship between the first recipient and the messaging service; and
   establishing a communication connection from the messaging server to the first recipient, if the first recipient is not in current communication with the messaging service.

2. The method of claim 1, wherein the method further comprises accumulating received locations of the user to form an activity log of the user.

3. The method of claim 2, wherein the method further comprises receiving from the mobile client device indication that said first recipient is authorized to receive the activity log, and transmitting said activity log to said first recipient.

4. The method of claim 3, wherein the activity log of the user further comprises a duration of time at each of the locations visited by the user.

5. The method of claim 1, wherein the method further comprises accessing a navigation web site to obtain map related information, and transmitting said obtained map related information to said first recipient.

6. The method of claim 1, wherein the method further comprises receiving a request from a second recipient to receive location information of the user, verifying authorization for the second recipient to receive location information of the user, and transmitting location information of the user to the second recipient, if the second recipient is verified to be authorized to receive location information of the user.

7. The method of claim 1, wherein the method further comprises receiving from the mobile client device, the identity of the user.

8. The method of claim 1, wherein the method further comprises receiving from the mobile client device an authorization duration for the first recipient, and said selecting comprises determining whether the first recipient remains authorized to receive location information of the user.

9. The method of claim 1, wherein establishing a communication connection to the first recipient further comprises transmitting the user's current location to the first recipient.

10. The method of claim 9, wherein at least one of said receiving comprises receiving from the mobile client device via a wireless communication connection, or said transmitting comprises transmitting to the first recipient via a wireless communication connection.

11. The method of claim 1, wherein establishing a communication connection to the first recipient further comprises rendering current location information received retrievable by the authorized first recipient.

12. A portable electronic apparatus comprising:
    a storage medium having stored therein a plurality of instructions that are machine executable, wherein the instructions are adapted to enable the portable electronic apparatus to select a first recipient authorized to receive location information of a user of the portable electronic apparatus to a messaging service, the first recipient being remotely disposed from the apparatus and the messaging service, to submit a current location of the user to the messaging service on behalf of the user, to enable the messaging service to select the first recipient based at least in part on the identity of the user and the selection of the first recipient provided by the portable electronic apparatus client device and independent of a current communication relationship between the first recipient and the messaging service, and to transmit the user's current location; and a processor coupled to the storage medium to execute the instructions.

13. The portable electronic apparatus of claim 12, wherein the instructions are further adapted to accumulate locations of the user to form an activity log of the user, and submit the activity log to the messaging service.

14. The portable electronic apparatus of claim 12, wherein the instructions are further adapted to sense one or more bio-metric data of the user, and perform said submission of a current location of the user, based at least in part on the sensed one or more bio-metric data of the user.

15. The portable electronic apparatus of claim 14, wherein the instructions are further adapted to access a global positioning system (GPS) to determine a current location of the user.

16. The portable electronic apparatus of claim 12, wherein the portable electronic apparatus further comprises a function button, and the instructions are further adapted to perform said submission, in response to a singular user action, selecting the function button.

17. The portable electronic apparatus of claim 12, wherein the instructions are further adapted to submit an authorization duration for the first recipient.

18. An apparatus comprising:
a storage medium having stored therein a plurality of instructions to receive from a mobile client device, a selection of a first recipient to receive location information of user of the mobile client device, and a submission of a current location of the user, to select the first recipient to receive the user's current location, based at least in part on the identity of the user and the selection of the first recipient provided by the mobile client device and independent of a current communication relationship or lack of a current communication relationship between the apparatus and the first recipient, and to transmit the user's current location; and
a processor coupled to the storage medium to execute the instructions.

19. The apparatus of claim 18, wherein the instructions are further adapted to accumulate submitted locations of the user to form an activity log of the user.

20. The apparatus of claim 18, wherein the instructions are further adapted to receive from the mobile client device, an authorization duration for the first recipient, within which the first recipient is authorized to receive the location information of the user of the mobile client device.

21. The apparatus of claim 18, wherein the instructions are further adapted to access a navigation web site to obtain map related information to include the map related information with said current location of the user.

22. The apparatus of claim 18, wherein the instructions are further adapted to receive a request from a second recipient for the current location information of the user, determine authorization of the second recipient, and transmit the user's current location to the second recipient, if the second recipient is determined to be authorized to receive the current location information of the user.

23. The apparatus of claim 18, wherein the first recipient has an authorization duration, and the instructions are adapted to further take into consideration the first recipients' authorization duration when performing said selection of the first recipient.

24. The apparatus of claim 18, wherein the instructions are further adapted to receive from the mobile client device, an identity of the selected first recipient.

25. A program product comprising a plurality of programming instructions adapted to program an apparatus to enable the apparatus to select a first recipient authorized to receive location information of a user of the apparatus to a messaging service, the first recipient being remotely disposed from the apparatus and the messaging service, to submit a current location of the user to the messaging service on behalf of the user, to enable the messaging service to select the first recipient based at least in part on the identity of the user and the selection of the first recipient provided by the apparatus and independent of a current communication relationship between the first recipient and the messaging service, and to transmit the user's current location.

26. A physical storage medium comprising a plurality of programming instructions adapted to program an apparatus to enable the apparatus to select a first recipient authorized to receive location information of a user of the apparatus to a messaging service, the first recipient being remotely disposed from the apparatus and the messaging service, to submit a current location of the user to the messaging service on behalf of the user, to enable the messaging service to select the first recipient based at least in part on the identity of the user and the selection of the first recipient provided by the apparatus and independent of a current communication relationship between the first recipient and the messaging service, and to transmit the user's current location.

27. A system comprising:
a communication interface;
a storage element;
a processor coupled to the communication interface and the storage element; and
a message module operated by the processor to enable the message module to select a first recipient authorized to receive location information of a user of the message module to a messaging service, the first recipient being remotely disposed from the message module and the messaging service, to submit a current location of the user to the messaging service on behalf of the user, to enable the messaging service to select the first recipient based at least in part on the identity of the user and the selection of the first recipient provided by the message module and independent of a current communication relationship between the first recipient and the messaging service, and to transmit the user's current location.

* * * * *